June 22, 1948.   M. E. CROST   2,443,603
ANALYSIS OF ELECTRICAL TRANSIENTS
Filed Feb. 27, 1943   3 Sheets-Sheet 1

INVENTOR
MUNSEY E. CROST
BY William D. Hall.
ATTORNEY

June 22, 1948.    M. E. CROST    2,443,603
ANALYSIS OF ELECTRICAL TRANSIENTS
Filed Feb. 27, 1943    3 Sheets-Sheet 2

INVENTOR
MUNSEY E. CROST
BY William D. Hall.
ATTORNEY

INVENTOR
MUNSEY E. CROST

Patented June 22, 1948

2,443,603

UNITED STATES PATENT OFFICE 2,443,603

ANALYSIS OF ELECTRICAL TRANSIENTS

Munsey E. Crost, Asbury Park, N. J., assignor to United States of America as represented by the Secretary of War Application February 27, 1943, Serial No. 477,340

11 Claims. (Cl. 175—183)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to electrical testing circuits, and more particularly, to circuits suitable for the study of transients.

In the design and construction of certain experimental circuits, it is often desirable to determine the existence and nature of transient currents. The presence and extent of these may often be ascertained from the operating characteristics of the circuit, but for a more detailed study, use of a cathode-ray oscilloscope is essential. The transients may be produced by alternately opening and closing the main feeder channel with a vacuum tube switching system controlled by a square wave of suitable frequency. If the transient is of relatively long duration, a conventional synchronized oscilloscope sweep system may be used. However, if the transient is of extremely short duration the known systems are not suitable, and there is a need for a faster system, having a higher resolving power.

According to this invention, two square waves of equal frequency and suitable phase displacement are used as sweep voltages. The voltage inversion in a theoretical square wave is instantaneous; in an actual wave, it occupies a finite time interval, producing a satisfactory sweep of extremely short duration. The invention applies the above principle to the delineation of transients and provides a means of separating the forward and reverse traces on the oscilloscope.

An object of this invention is, therefore, to provide a novel test circuit capable of producing outlines of extremely fast transients.

Another object of this invention is to provide a novel test circuit capable of producing the visual indication of recurring transients on the screen of an oscilloscope.

Still another object of this invention resides in the provision of a novel apparatus for generating a rectangular sweep circuit for a cathode-ray oscillograph, and a circuit for synchronous control of the generation of transients in a network under test so that the build-up transients and the decay transients appear along two opposite sides of a rectangle produced by the oscilloscope beam.

In accordance with the present invention there is provided an audio-oscillator connected to two parallel channels, each of said channels transforming the sinusoidal wave into a series of square waves. Two of said square waves are used for producing a rectangular sweep pattern on an oscilloscope screen, and the third wave is used for initiating the transients in a network under test in strict synchronism with, and in definite phase relation to, two opposite sides of the rectangular sweep voltages impressed on the oscilloscope deflection plates. The resolving power of the circuit is varied by varying the frequency of the audio oscillator.

The novel features which I believe to be characteristic of my invention are set forth with particularity in the appended claims. Two forms of my invention, however, both as to their organization and method of operation together with further objects and advantages thereof, may best be understood by reference to the following description taken in connection with the accompanying drawings, in which:

Figure 3 illustrates the manner in which the square waves are combined to produce the rectangular oscilloscope sweep, and the viewing screen of an oscilloscope;

Figure 4 illustrates an oscilloscope screen with the transients shown as they may appear on the screen;

Figure 6 illustrates a portion of a keyed sinusoidal wave.

Figure 1:
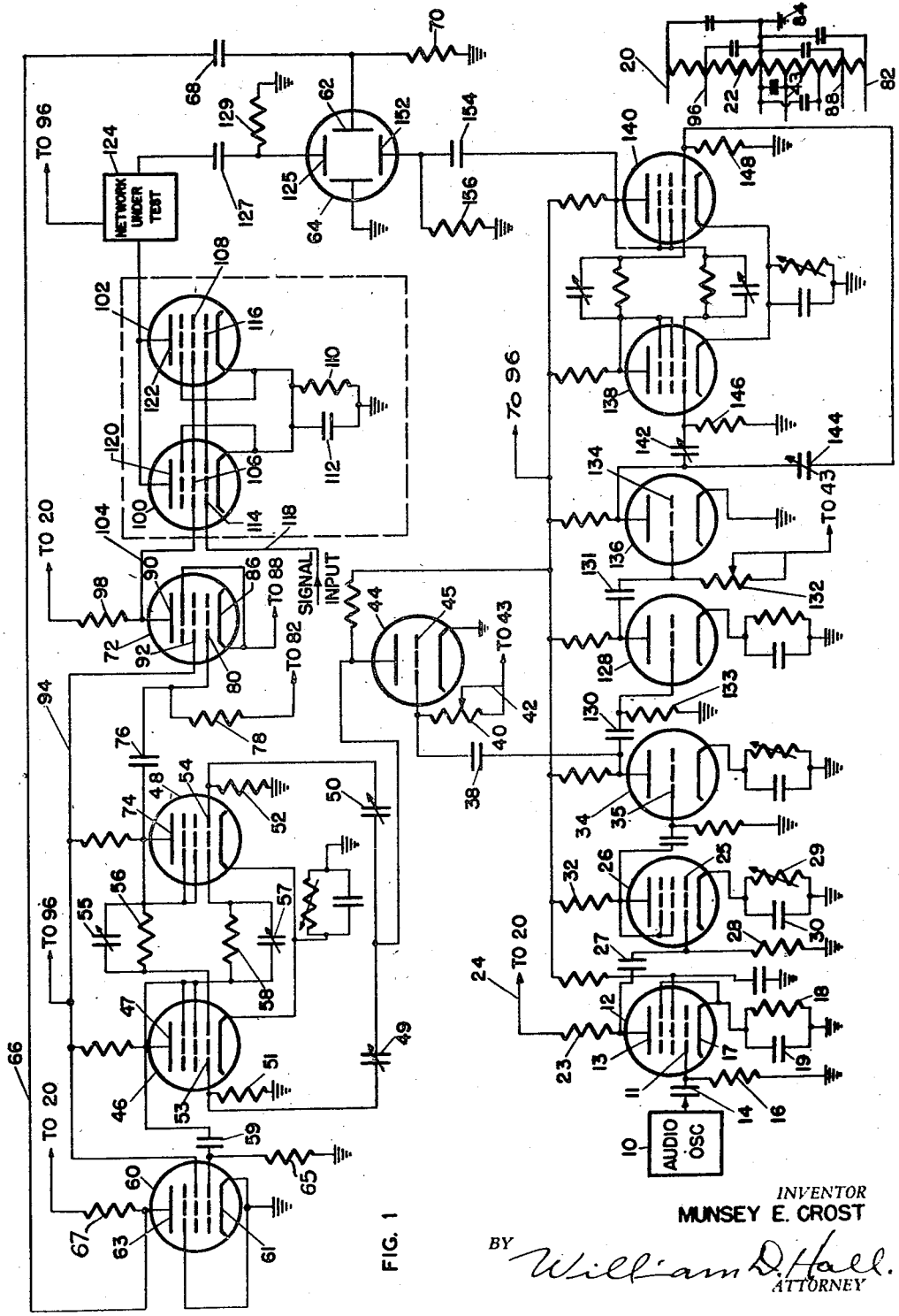
Figure 1 is a schematic diagram of one embodiment of the test circuit.

The invention is described, by the way of an example, wherein a sinusoidal wave is used for producing the transients.

Figure 6 illustrates one interval out of a series of intervals of the sinusoidal wave keyed by the square wave. The wave has a build-up period 602, which corresponds to that portion of the wave which produces the build-up transients. This period merges into that period illustrated at 604 when the sinusoidal wave has a constant amplitude, the latter being followed by the period illustrated at 608 corresponding to the period producing the decay transients.

According to this invention, a rectangular sweep pattern is produced on an oscilloscope screen as illustrated in Fig. 3 at 350—352—354—356, and back to 350. The keyed sinusoidal wave illustrated in Fig. 6 is impressed on one of the deflection plates of the oscilloscope in such a manner that the build-up transients 602 are reproduced on an oscilloscope screen 64, Fig. 3, along the upper horizontal sweep line 356—350, and the decay transients are reproduced along the lower sweep line 352—354. This is illustrated in Fig. 4, which illustrates the build-up transients' envelope at 404, and the decay transient envelope at 402. Since the cathode-ray beam does not travel in the horizontal direction, i. e. along sweeps 352—354 and 356—350, Fig. 3, during the constant amplitude period 604 of the sinusoidal wave, this constant amplitude period appears on the cathode-ray screen as vertical lines 406 and 408, which are produced by the constant amplitude portion of the signal when the cathode-ray beam remains stationary at the corners 350 and 352.

The relationship of the rectangular sweep to the keyed wave is further illustrated in Fig. 6 where the numerals above the wave correspond to the numerals used in Fig. 3 for indicating the rectangular sweep pattern. Thus, when the build-up transients 602, take place, the cathode-ray beam travels from corner 356 to corner 350, etc.

Referring to Fig. 1 for a detailed description of my invention, an audio-frequency oscillator 10 is capacitively coupled to control grid 11 of pentode 12, through condenser 14 and resistance 16; cathode 17 of this pentode is connected to ground through resistance 18 and by-pass condenser 19, the latter resistance-condenser combination being so adjusted that the tube operates as a linear amplifier of the sinusoidal waves impressed upon it. This sinusoidal wave is illustrated at 1 in Fig. 2. Plate 13 of amplifier 12 is connected to stub 20 on bleeder resistor 22, illustrated at the right bottom corner of this figure, through resistor 23 and conductor 24. The output of this amplifier is capacitively coupled to grid 25 of pentode 26 through condenser 27 and grounded grid resistor 28. This pentode is adjusted by means of resistor 29 and condenser 30 to operate as an overdriven linear amplifier which transforms the sinusoidal wave impressed on its grid into a wave having approximately a square pattern, as illustrated at 2 in Fig. 2. The output of this pentode is capacitively coupled to a second linear overdriven amplifier 34 which amplifies the square wave illustrated at 2 still further by making the approximately vertical slopes of the square wave impressed upon it still steeper. This is accomplished by amplifying only that part of the square-wave signal impressed on grid 35 which has the highest rate of change of voltage, and by cutting off the remaining upper and lower portions of the impressed signal. The output of amplifier 34 is connected to two parallel channels, one of which is a differentiating circuit, comprising condenser 38 and resistance 40, and the other is an amplifier 128. Resistance 40 is connected through conductor 42, to bleeder resistor 22 at tap 43. This circuit represents the input circuit of amplifier tube 44 which is normally biased below its cut-off potential by the negative potential impressed on grid 45 through conductor 42. The square wave impressed on the differentiating circuit is differentiated in a manner indicated at 4 in Fig. 2, so that the signal impressed on grid 45 of this amplifier represents a series of short positive and negative peaks whose exponential curve patterns are determined by the time constant of the differentiating circuit. The time constant of this circuit is sufficiently small so that the pulses 4 are very short. Only the upper peaks of the positive pulses 4 render amplifier 44 conductive, and, after being amplified, they appear in the plate circuit of this amplifier as a series of negative pulses 5, Fig. 2. These negative pulses are impressed on a trigger circuit composed of pentodes 46, 48. The connection between amplifier 44 and the trigger circuit is through variable condensers 49 and 50 and grid resistors 51 and 52, which are connected to control-grids 53 and 54 respectively.

Tubes 46—48 function as a trigger circuit, having two degrees of stability, in which only one tube may be conductive at any given time. Since grid 53 is connected to plate 74 through resistor-condenser combination 56—55, and grid 54 is connected to plate 47 through resistor-condenser combination 58—57, when either of the tubes has its conductivity decreased by a negative pulse appearing on its control grid, the rise in plate potential caused by the decrease in current through its plate resistor is transmitted in reduced value to the control grid of the opposite tube. This latter tube now tends to become conductive, and the resultant drop in its plate potential, which is an amplified reproduction of the signal appearing on its grid, but opposite in phase, is in turn transmitted to the control grid of the first tube of the pair, where it acts to increase the effect of the original negative pulse, i. e., to render the tube less conductive. This regenerative cycle, which takes place in a fraction of a micro-second, continues until the first tube is completely non-conducting and the second tube has its conductivity limited by circuit constants. When this condition is reached, no further action takes place since the direct-current connections between grids and opposite plate circuits insure that this condition is one of the two stable states of the circuit. The negative pulse from the input circuit appears on both control grids simultaneously, but the effect on the tube which is originally non-conducting is negligible, inasmuch as the duration of this pulse is very short, and the amplified positive signal applied to the control grid of this tube by the plate of the other originally conducting tube is sufficiently great to mask the negative signal.

The condensers in these plate-grid circuits are used for a quick transfer of energy when one tube is rendered conductive, and another tube is rendered non-conductive, whereas the resistances are used to supply direct-current bias for holding the trigger circuit in one degree of stability between the triggering pulses impressed upon it by tube 44. The trigger circuit just described may have either one or another degree of stability at the time the entire test circuit is turned on. However, since the entire circuit represents a symmetrical network, and there is a continuous flow of signals related to each other in phase, no special means are provided in this test circuit for determining which of the tubes will be rendered conductive at the time the circuit is turned on. With the phase relationship of the signals illustrated in Fig. 2, the signals impressed on the grids of the trigger tubes are of negative polarity. They render the conducting tube non-conductive. It should be noted, however, that the same final result will be accomplished, in connection with the trigger circuit, if a positive grid signal, rather than a negative signal, is impressed upon it. The adjustment of the constants in a trigger circuit of this type is described in the article by Willard H. Feen, Review of the Scientific Instruments, vol. 11, page 369 (November 1940).

On the output side of the trigger circuit the circuit branches out once more into two channels, one of which is used for producing a sweep voltage, and another for keying a network under test.

The output of tube 46, is connected to the sweep voltage channel; it is capacitively coupled to tube 60 by means of condenser 59 and grid resistance 65. Cathode 61 of this pentode is grounded and plate 63 is connected through resistor 67 to bleeder resistor 22 at tap 20. This pentode acts as a linear amplifier for the square-wave signal impressed upon its grid by the output of tube 46. Tube 60 is illustrated as being a pentode, but any other tube which functions well as a linear amplifier, and whose grid voltage can swing above ground and still give a linear amplification, may be used. The output of this tube is a very strong, substantially square-wave signal which is impressed on horizontally deflecting plate 62 of cathode-ray tube 64. The circuit between plate 63 and plate 62 is through conductor 66, condenser 68, and resistance 70, the latter being connected to ground.

The other half of the trigger circuit is used for keying the network under test, and is connected to switching tube 72; the connections are: plate 74 of tube 48, condenser 76, grid resistor 78, negative potential tap 82 on bleeder 22, and grid 80. Bleeder resistor 22 itself is grounded at tap 84. Cathode 86 of this tube is connected to tap 88 on the same bleeder resistor, this tap being also considerably below the ground potential of the bleeder. Plate 90 of the trigger tube is connected to positive tap 20 on the bleeder while screen grid 92 is connected through conductor 94 to bleeder tap 96. The suppressor grid of the switching tube is connected to the cathode. The switching tube should have high current capabilities, and, preferably, a high trans-conductance; moreover, it should have such characteristics that only a small grid voltage would be required to cut it off. In the circuit, tube 72 functions as an overdriven amplifier which acts as a part of a potential divider consisting of resistor 98 and tube 72 between tap 20 of bleeder resistor 22 and tap 88 of the bleeder. When the positive square-wave signal is impressed on grid 80, it renders the tube conductive, and, because of its high current capabilities, large plate current flows through cathode-plate circuit and resistor 98 connected to plate 90. Because of large plate current, the plate voltage drops to near ground or below ground, and this potential is transmitted to a keyer comprising pentodes 100—102 connected in parallel. The connection between the plate circuit of switching tube 72 and the keyer is through conductor 104 and screen grids 106—108. The cathodes of the keyer are grounded through resistor 110 and by-pass condenser 112. This bias circuit is so adjusted that the tubes normally operate as linear amplifiers for the signals impressed on control grids 114—116 from a signal input circuit indicated by conductor 118. Plates 120—122 of the keyer are connected to a positive potential source tap 96 through a suitable component in network-under-test 124. When switching tube 72 is rendered conductive by the square wave impressed upon its grid by the trigger, large plate current lowers the plate potential of this tube to a near ground or below ground potential. Since screen grids 106—108 of the keyer are directly connected to plate 90 of the switching tube, the potential variations in the plate circuit of the switching tube are directly impressed on the screen grids of the keyer, and, when this potential approaches or drops below the ground potential, the keyer tubes are rendered non-conductive.

Figure 2:
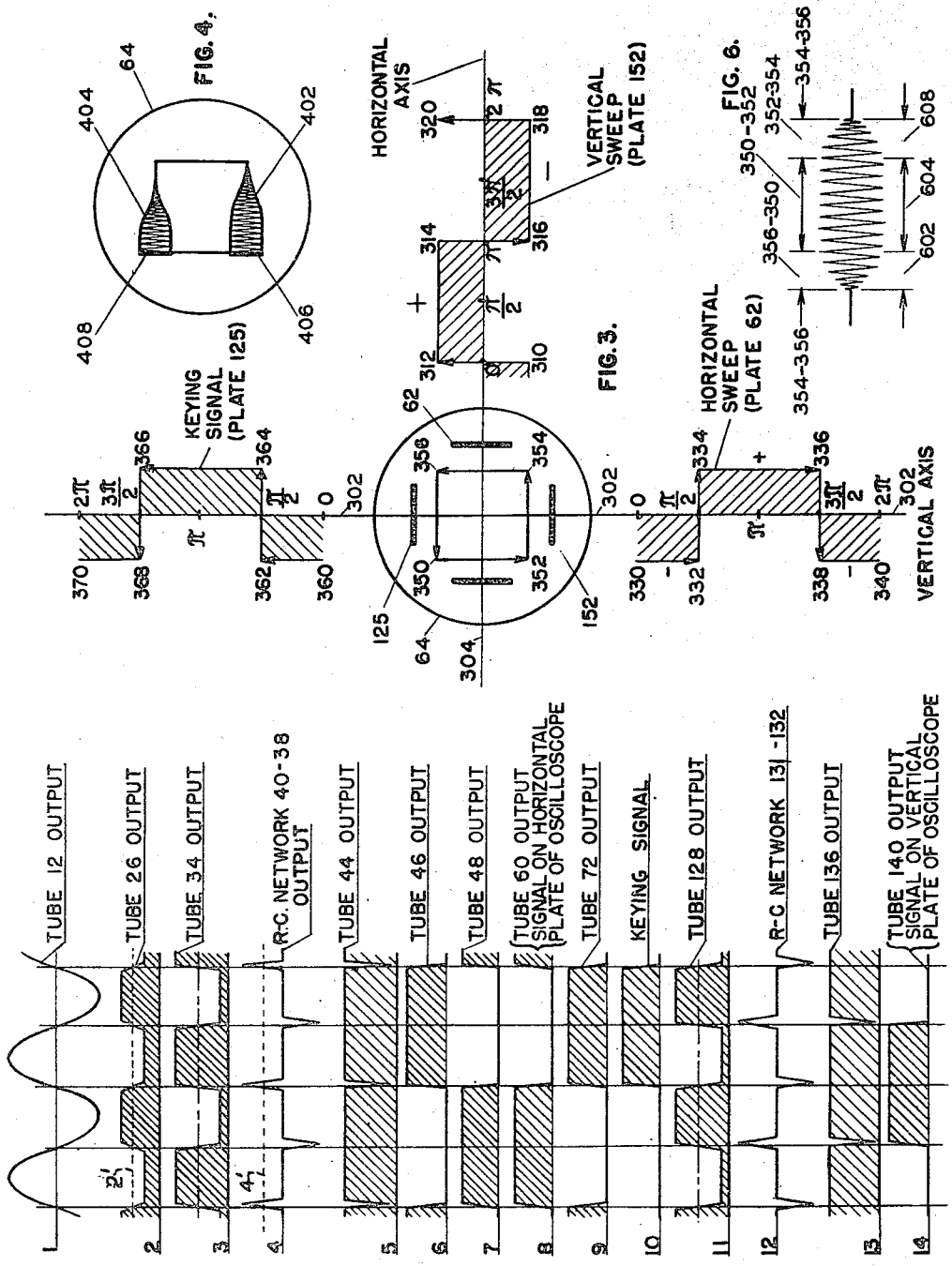
Figure 2 illustrates the wave shapes and phase relationships of the waves at various stages in the circuit.

It is to be noted that the periodicity of this keying by means of one of the square waves generated by the trigger, is obviously exactly the same as the periodicity of the square wave impressed on the horizontal plate of the cathode-ray tube, and, as it will subsequently appear, it also has the same periodicity as the square wave impressed on the vertical plate of the cathode-ray tube. The phase relationship between these waves is illustrated in Fig. 2 at 8, 10 and 14. The output of test circuit 124 is connected to vertical plate 125 by condenser 127 and grounded resistor 129. When signals of continuous nature, such as a sinusoidal wave, are impressed by signal input circuit 118 on control grids 114—116 of the keyer, they are amplified, keyed by the keyer, and impressed on the input side of network 124. Here this keyed signal may produce transients either at the beginning or at the end of the impressed signal, and it is these transients, together with the keyed signal, that are impressed on vertical plate 125 of the cathode-ray tube.

The output of amplifier tube 34, as mentioned before, besides being connected to resistance-condenser differentiating network 38—40, is also capacitively coupled to an overdriven linear amplifier tube 128 through condenser 130 and grounded grid resistor 133. Tube 128 is used primarily for inversion of the square-wave signals impressed upon it. The amplified square-wave signals appear in the plate circuit of this tube as illustrated at 11 in Fig. 2, and are impressed on the condenser-resistance differentiating network 131—132, identical to network 38—40 connected to the plate circuit of tube 34. Just as in the previous case, the square-wave output of tube 128 is differentiated by this network, and is impressed on grid 134 of tube 136 in a form of sharp, short pulses illustrated at 12 in Fig. 2. The upper parts of the positive pulses are amplified by tube 136, which functions in a manner identical to that of tube 44, and are impressed on the second set of trigger tubes 138, 140 through adjustable condensers 142, 144, and grid resistors 146, 148 respectively. The pulses impressed on the trigger tubes are illustrated at 12 in Fig. 2. The functioning as well as the connections of this trigger circuit are identical with those of the first trigger circuit described previously, and composed of tubes 46 and 48. The output of tube 136, which is in a form of negative pulses, is impressed on the grids of the trigger circuit, rendering that tube non-conductive which happened to be conductive at the time. Just as in the case of the trigger circuit 46—48 no provisions are made to insure an invariable initial firing of one particular tube. The square wave output of tube 140, illustrated at 14 in Fig. 2, is impressed on vertical plate 152 of cathode-ray tube 64 through coupling condenser 154 and resistance 156.

The operation of the transient test-circuit is as follows: The sinusoidal wave output of audio-oscillator 10 is amplified by linear amplifier 12, and it appears in an amplified form 1, Fig. 2 in the output of the amplifier. This wave is transformed into wave 2, Fig. 2, by overdriven amplifier 26. It represents only that positive and negative portion of the sinusoidal wave 1 which can get through amplifier 26. This is the beginning of the process of deriving an extremely fast sweep circuit. The wave 2 is impressed on linear amplifier 34 which is overdriven by the impressed signal and can amplify only that portion of wave 2 which is near the dotted line 2'. Therefore, it amplifies only that portion of the signal impressed upon it which has the highest rate of change of voltage, and cuts off the remaining portion. It thus produces in its output, an approximately square wave 3 which has much steeper side slopes than the impressed signal. This square wave is impressed on the condenser-resistance differentiating network 38—40 whose constants are such that it modifies the impressed signal into a series of sharp short pulses 4.

Only the upper part of the positive peaks of these pulses, which is above the dotted line 4', is amplified by amplifier 44, which is biased below cut-off. Therefore, the positive pulses 4 are not only amplified but also shortened so that their sharpness is increased still further. The resulting pulses 5, as they appear in the plate circuit of tube 44, are impressed on the trigger circuit which transforms them into two series of square waves 6 and 7 respectively which are 180° out of phase with respect to each other. One of these waves, wave 8, is impressed on amplifier 60, which in turn impresses it on the horizontal plate 62. The other square wave, wave 9, which appears in the output of tube 48, is impressed on switching tube 72 which keys tubes 100—102 by impressing its output on the screen grids of the keyer tubes; thus the keyer tubes are rendered conductive only when tube 72 is non-conductive. Since the keyer is connected between input conductor 118 and the network-under-test 124, it keys the input signal impressed on the network at the frequency of the square wave 9. If the network is capable of generating any transients when a sharply keyed signal is impressed upon it, then the transients will be impressed on one of the vertical plates of the cathode-ray tube in a manner described previously. The keying signal itself appears as a keyed rectangular wave 10, the transients obviously not appearing in the drawing because of their almost instantaneous nature.

As previously stated, the output of tube 34, besides being impressed on the differentiating network is also impressed on the circuit which is in parallel with it, comprising a linear amplifier 128 used as an inverter for the square wave impressed upon it. The output of amplifier 128, illustrated at 11 in Fig. 2, is differentiated in R.-C. network 132—131 to create the pulse signal 12. Tube 136, like tube 44, amplifies the upper part of the positive pulses 12 so that they appear as negative pulses 13 in the output circuit of this tube. These negative pulses are impressed on the control grids of the trigger circuit 138—140, where they create a series of square waves 14, which are impressed on vertical plate 152 of the cathode-ray oscillograph. Examination of the wave forms and their phase relationships reveals that the sweep pattern on the oscilloscope screen is the resultant of square waves 14 and 8. Square wave 8 is applied to the horizontally deflecting plate, and square wave 14 is applied to the vertically deflecting plate, as illustrated in Fig. 3.

Referring to Fig. 3, the screen of the oscilloscope 64 has its horizontal and vertical axes illustrated at 302 and 304. The vertical and horizontal deflection plates bear the same numerals as in Fig. 1. The rectangular waves are positioned to illustrate the effect they produce, i. e. the vertical sweep wave is placed along the horizontal axis, and the horizontal sweep wave is placed along the vertical axis. Therefore, in Fig. 3, the vertical plate voltage, impressed on plate 152, which corresponds to the square wave 14 in Fig. 2, appears as a square wave 310—320, and the voltage impressed on plate 62 appears as a square wave 330—340; the latter corresponds to square wave 8 in Fig. 2. Comparison of the phase relationships of these waves in Figs. 2 and 3 reveals that there is a 90 degree phase displacement between these waves. It should be noted here that while in Fig. 2 these waves appear as being positive in voltage, in Fig. 3 their reference axes are displaced, and they appear as a series of square waves having a positive and negative sign. This is accomplished in a well known manner by superimposing the varying component of the waves upon the direct current biasing potentials on the deflection plates. At points 310 and 330, when the time is slightly before zero, both voltages are, for example, negative, and therefore, the beam will be held at corner 350 of the rectangular sweep pattern. The spot is swept across the screen from 350 to 352 by the voltage shift on the vertical plate 152 from minus to plus, or from point 310 to point 312. The spot remains at 352 until time $$\frac{\pi}{2}$$

when the voltage inversion from minus to plus, or from 332 to 334, on the horizontally deflecting plate 62 causes the spot to move from 352 to 354. Here it remains until time $\pi$, when the voltage shift on the vertical plate from 314 to 316 causes it to travel from 354 to 356. It rests here until time $$\frac{3\pi}{2}$$

when the second voltage inversion from plus to minus, or from 336 to 338, on the horizontal plate 62 causes it to return to 350. Thus, when the transients are not superimposed on the sweep voltages, the normal pattern traced by the cathode-ray beam is that of a rectangle or square, depending upon the relative amplitudes of the square waves.

The network signal is impressed on the vertically deflecting plate 125, and it appears as a vertical displacement of the sweep trace. Its course is illustrated at 360—370 in Fig. 3 in proper phase relationship with respect to the sweep circuit waves. It is in phase opposition to the horizontal sweep voltage 330—340, and, therefore, if the transients are produced in the network at the beginning and at the end of the signal, which is obviously the case if they are produced at all, they will be produced during that period when wave 360—370 passes from 362 to 364 (termination of the network signal), from 366 to 368 (beginning of the network signal), etc. . . . Since these periods are in phase with the changes in the horizontal sweep voltage, the transients produced will appear when the cathode-ray beam travels from 352 to 354 and from 356 to 350. The actual patterns of the transients' outlines as they appear on the oscilloscope screen are illustrated at 402 and 404 in Fig. 4. A study of the patterns indicates that on the upper line there is a transient wave that takes place at the beginning of the network signal, and on the lower line there is a transient wave which indicates that the circuit has just been opened. Thus the build-up transient 404 is reproduced on the top sweep, and it is separated from the decay transient 402, which appears on the bottom sweep.

From the above description of the circuit, the advantages of it become apparent. Production of the transients is constantly in strict synchronism with the rectangular sweep produced on the oscilloscope screen, and the build-up and decay transients appear along two independent horizontal axes on the oscilloscope screen.

In describing the test circuit illustrated in Fig. 1, it has been stated that the circuit does not provide any special means for definitely establishing the firing order of the trigger tubes 46—48 and 138—140. Therefore, there is a possibility of reversal in the firing order with the resulting reversal in rotation of the rectangular sweep of Fig. 3. Accordingly, with the circuit shown in Fig. 1, there is no assurance as to whether the build-up or decay transients will appear along the upper or the lower horizontal sweep lines. Whenever the approximate shape of the transients is known in advance, the foreknowledge of the direction of the rotation of the rectangular sweep may not be especially important, since the shape of the transients themselves will at once reveal which of these transients is a build-up or a decay transient. However, this is not necessarily always the case, and there are situations where the knowledge of the direction of rotation of the oscilloscope sweep is necessary.

Moreover, there is an additional requirement which should be considered. The duration of the transient in different circuits may differ appreciably, and besides the adjustment of the speed of the sweep circuit, which may be accomplished by changing the frequency of oscillator 10, it is very desirable to have some means for centering the image of the transients, or examining a portion of the transient on a magnified scale, even if such examination is made at the expense of a momentary elimination of the remaining portion of the transient. Such adjustment would not only center the image of the transient on the oscilloscope screen, but, by combining it with the adjustment of the speed of the sweep circuit through variation of the frequency of the audio oscillator 10, it would enable one to choose any part of the transient and magnify it along the horizontal axis to a very considerable extent.

Figure 5:
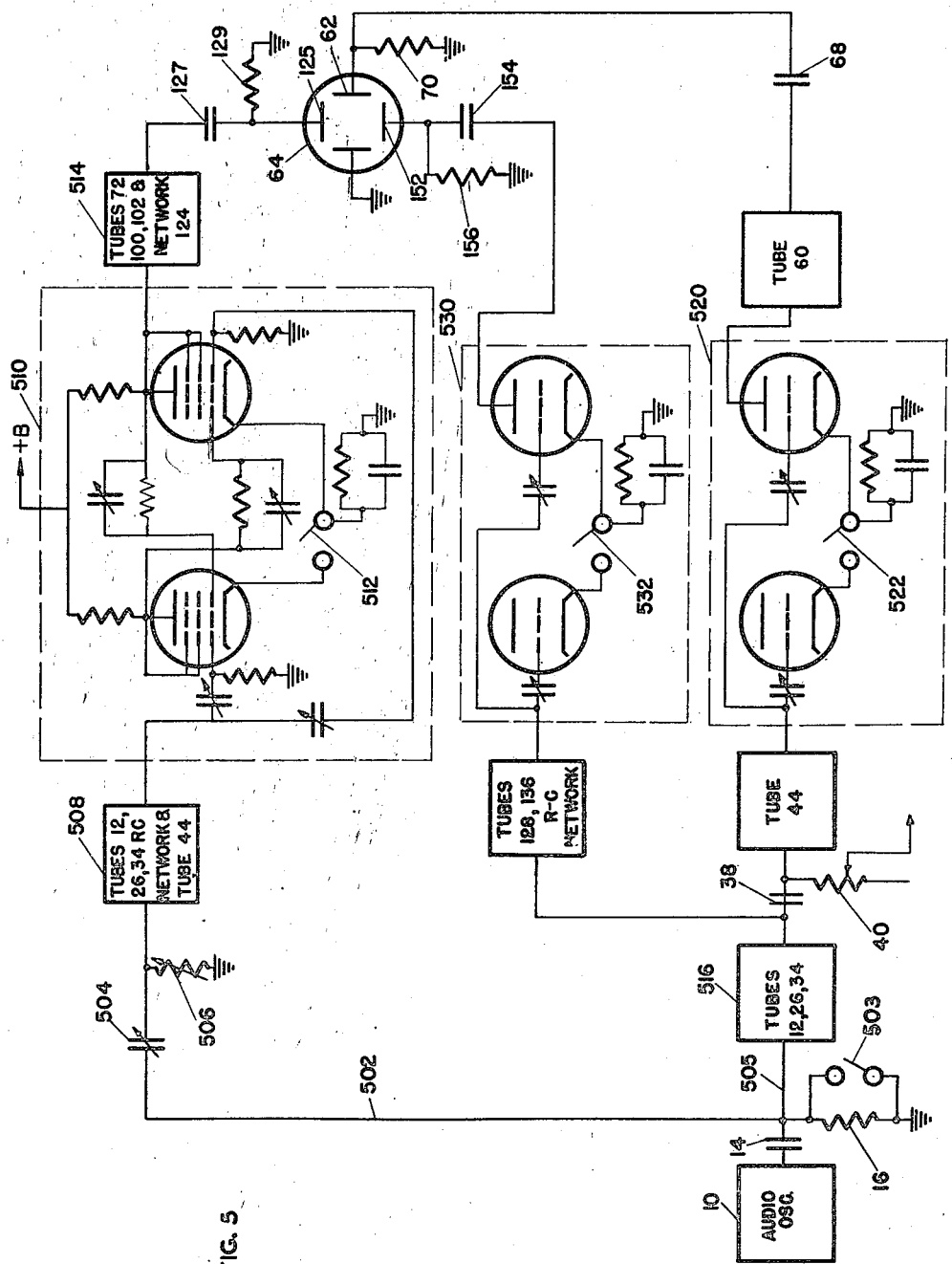
Figure 5 is a schematic diagram of the test circuit shown in Fig. 1.

A modified form of the test circuit which incorporates the above mentioned features, i. e. a circuit the firing order of which is known in advance, and the image centering adjustment, is illustrated in Fig. 5. Since a large number of elements and their connections in Fig. 5 are identical with those in Fig. 1, they are illustrated in a block form in Fig. 5 and bear the same numerals as in Fig. 1.

Referring to Fig. 5, oscillator 10 is capacitively coupled by condenser 14 to two parallel channels through conductors 502 and 505. Grounded grid resistor 16 is now equipped with switch 503 which can short-circuit the output of oscillator 10 to ground. The upper channel, which is used for keying the transient generating network, is provided with a phase shifter composed of variable condenser 504 and variable resistor 506. The phase shifter is connected to an amplifier and pulse shaper 508, which includes tubes 12, 26, 34, R. C. network and tube 44 of Fig. 1, having the same connections and functioning as the corresponding elements in Fig. 1. The output of tube 44 in Fig. 5 is connected to a trigger circuit which is identical with the trigger circuit shown in Fig. 1, except that in Fig. 5 the cathode element of one tube is provided with a switch 512 which disconnects it from the biasing resistor and condenser. The output of trigger circuit 510 is connected to a keyer 514 which includes tubes 72, 100, 102 and network 124 of Fig. 1. The output of network 124 is connected to vertical plate 126 of cathode ray tube 64, just as in Fig. 1.

The second control channel, which is connected to audio oscillator 10 through conductor 505, couples the oscillator to an amplifier and pulse shaper 516 which includes tubes 12, 26 and 34 of Fig. 1. At the condenser-resistance differentiating network 38—40, the second channel branches out into two independent sweep control channels. The lower channel is identical with that of Fig. 1, which is used for producing the square wave impressed on horizontal plate 62 with these differences: while in Fig. 1, one trigger circuit is used for generating a square wave impressed on the horizontal plate 62 as well as for synchronous keying of network 124, in Fig. 5 the horizontal sweep channel has an independent trigger circuit 520 with a cathode switch 522. The channel which is used for producing the vertical sweep voltage, and which is connected to vertical plate 152, is identical with the same channel of Fig. 1 except that trigger circuit 530 is provided with a cathode switch 532 in one of its cathode circuits.

The operation of the test circuit of Fig. 5 is as follows: The circuit is started with switch 503 closed and switches 512, 522 and 532 open. This grounds the output of oscillator 10 and disconnects one of the tubes in each of the trigger circuits with only one tube in each of them remaining connected. After opening of the switches, the test circuit is started by connecting it to a source of potential, and, because of the plate potential impressed on the control grids of the trigger tubes remaining in the circuit, they are rendered conductive. They remain conductive because of the plate potential impressed on their grids. This at once determines the firing order of all trigger circuits so that switches 512, 522 and 532 may now be closed without producing any reversal in that order or upsetting the original degree of stability assumed by the trigger circuits. Switch 503 is now opened, and the circuit is ready for operation.

To provide centering adjustment for the transients on the oscilloscope screen, the keying channel is now directly connected to the oscillator through conductor 502 and the phase shifter 504—506. The remaining part of the keying channel, including amplifier and pulse shaper 508, trigger circuit 510, and the keying circuit 514, function in the manner described in connection with the description of Fig. 1. Because the keying channel is now an independent channel equipped with the phase shifter, the phase shifter can be used for shifting the square wave generated by trigger circuit 510. This in turn will result in the control of the phase relationship between the sweep circuits and the transients. Thus it follows that the transients may now be shifted horizontally to any desired extent along the horizontal sweep lines.

From the description of my invention given above, it follows that it is capable of giving two separate images on the oscilloscope screen of the outlines or the envelopes of the build-up and the decay transients. Moreover, the horizontal resolving power of these images may be varied by varying the speed of the sweep circuit.

Since the outline of the transients is, as a rule, more important than the reproduction of the transients in a line form, the circuits do not make any provisions for reproducing the transients in the above-mentioned line-form. However, it will be obvious to those skilled in the art that this result may be obtained by synchronizing the wave shown in Fig. 6 with the sinusoidal wave generated by oscillator 10, or by using an oscillator for producing network 124 signal also for generating the sweep voltage after passing the output of the oscillator through a frequency reducer. In the latter case the transients will be reproduced not in the outline form but as the line-traces of the transient waves themselves.

What I claim is:

1. A method of producing visual indications of transients by means of a cathode ray tube having a fluorescent screen, which includes the steps of generating a sinusoidal wave, transforming said sinusoidal wave into two substantially square waves of equal period and 90° out of phase, and a third substantially square wave of equal periodicity as said two square waves and in phase oppositon with one of said two square waves, impressing said first two square waves on said tube for producing a rectangular sweep pattern on said screen, and initiating and terminating the transient phenomena impressed on said cathode-ray tube with the aid of said third wave.

2. In a method of producing indications of electrical transients on the screen of a cathode ray tube, the steps which include, generating a sinusoidal wave, converting said sinusoidal wave into three substantially square waves, producing a rectangular sweep pattern on said screen with the aid of two waves, and timing the generation of said transients with the aid of the remaining wave.

3. The method of producing indications of recurrent electrical build-up and decay transients on the screen of a cathode-ray oscilloscope, which includes the steps of deflecting the beam of said cathode-ray oscilloscope to produce a lower trace moving in one direction and an upper trace moving in the opposite direction, and deflecting said beam from normal directions of the upper and lower traces with the aid of said transients to modulate said upper trace with said build-up transients, and said lower trace with said decay transients.

4. The method as defined in claim 3 which further includes the additional steps of deflecting said beam from said upper trace to said lower trace during the time interval between the build-up and decay transients, and deflecting said beam from said upper trace to said lower trace during the time interval between the decay and the build-up transients.

5. In an oscilloscope system, a source of alternating current, means for converting said source of alternating current into a first square wave whose "on" period and "off" period are each substantially equal to the period of said sinusoidal wave, a second means for producing a second square wave having a period equal to the period of said first square wave and lagging by 90° said first wave, a cathode-ray tube having horizontal and vertical deflection means, means for impressing said first wave on said horizontal deflection means, and means for impressing said second wave on said vertical deflection means, whereby said waves produce a rectangular sweep pattern on the screen of said cathode-ray tube.

6. In a circuit for producing indications of transients, a source of sinusoidal wave, means for converting said sinusoidal wave into a first square wave whose "off" and "on" periods are each substantially equal to the period of said sinusoidal wave, a second means for converting said sinusoidal wave into a second square wave of a period equal to the period of said first square wave, a cathode-ray tube having horizontal and vertical deflection means, means for impressing said first square wave on said horizontal deflection means, means for impressing said second square wave on said vertical deflection means 90° behind said first square wave, means for generating a third square wave in phase-opposition to one of said square waves, a test circuit, means for keying said test circuit with said third wave, and means for impressing the output of said test circuit on said vertical deflection means.

7. In a circuit for producing indications of transients, a source of sinusoidal wave, a first amplifier connected to said source, said first amplifier changing said sinusoidal wave into a first substantially square wave, a second thermionic amplifier connected to said first amplifier, an R.-C. network connected to the output of said second thermionic amplifier and capable of differentiating and transforming said first square wave into a series of positive and negative pulses, a third thermionic amplifier connected to said network and capable of amplifying only a positive series of said pulses, a first trigger circuit, having two degrees of stability, connected to the output of said third amplifier and capable of generating two square waves 180 degrees out of phase with respect to each other in its first and second output circuits, a fourth thermionic amplifier connected to the first output circuit of said first trigger circuit, a cathode-ray tube having horizontal and vertical deflection plates, one of the horizontal deflection plates of said cathode-ray tube being connected to the output circuit of said fourth thermionic amplifier, a keyer connected to the second output circuit of said first trigger circuit, a test circuit keyed by said keyer and capable of generating transients when keyed by said keyer, the output circuit of said test circuit being connected to one of the vertical plates of said cathode-ray tube, a fifth thermionic amplifier connected to the output of said first amplifier and having a second R.-C. network in its output circuit, said second network differentiating and transforming the square wave output of said fifth amplifier, a sixth thermionic amplifier connected to said second R.-C. network and capable of amplifying only the positive pulses produced by said second R.-C. network, a second trigger circuit connected to the output of said sixth amplifier, said second trigger circuit having two degrees of stability and capable of generating a second square wave 90 degrees out of phase and of equal periodicity as said first square wave, and means for impressing said second square wave on the other vertical plate of said cathode ray tube, whereby said first and second square waves produce a rectangular sweep pattern on said cathode-ray tube, and said test circuit produces visual indications of said transients on two opposite sides of said rectangular sweep.

8. In a transients test-circuit, an oscilloscope, means for producing a rectangular sweep on the screen of said oscilloscope, means for controlling the direction of rotation of said sweep, a source of transients connected to said oscilloscope, means for controlling the generation of said transients in a predetermined phase relationship with respect to said sweep, and means for varying said phase relationship.

9. In a transients test-circuit, an oscillator, an oscilloscope, means connected to said oscillator for producing rectangular sweep pattern on the screen of said oscilloscope, a source of signals, a keying circuit connected to said oscillator, a network under test having an input and output circuit, said input circuit being connected to said source of signals and to said keying circuit, whereby said network is keyed in synchronism with said sweep circuit by said keying circuit, a connection between said oscilloscope and said output circuit, and means in said keying circuit and said sweep circuit for controlling the phase relationship between said keying and sweep circuits.

10. A test circuit for producing indications of transients including an oscillator, a first, a second, and a third parallel channel connected to said oscillator, means in each of said channels for converting the sinusoidal wave generated by said oscillator into a series of periodic pulses synchronously related to similar pulses in the other channels, an oscilloscope with vertical and horizontal deflection elements, a trigger circuit in each of said channels connected to its respective means, each of said trigger circuits converting said pulses into a series of substantially square waves, the output of said first and said second channels being connected respectively to said horizontal and said vertical deflection elements for producing a rectangular sweep pattern of a predetermined rotation on the screen of said oscilloscope, a network under test connected to a source of signals and also connected between a third trigger circuit in said third channel and said vertical deflection element, said network being keyed by said trigger circuit so as to generate the build-up and the decay transients in such a relationship with respect to said rectangular sweep pattern that the build-up transients appear along one side of said rectangular sweep pattern and the decay transients appear along the opposite side of said rectangular sweep pattern, a phase shifter connected between said oscillator and said means in said third channel, said phase shifter being capable of shifting said transients laterally along said sides, and said oscillator being capable of varying the speed of rotation of said sweep pattern with variation in its frequency.

11. A method of producing visual patterns of recurrent build-up and decay transients on an oscilloscope screen including the steps of generating a sinusoidal wave, converting said sinusoidal wave into two displaced, substantially rectangular waves for producing rectangular sweep pattern on said oscilloscope, converting said sinusoidal wave into keying pulses for producing said recurrent transients in synchronism with said sweep pattern, impressing said transients on said oscilloscope so that the build-up transients appear along one side of said rectangular sweep pattern, and the decay transients appear on the opposite side of said rectangular sweep pattern, and varying the phase of the portion of said sinusoidal wave which is utilized for producing said recurrent transients for adjusting the lateral position of said transients along said sides.

MUNSEY E. CROST.

REFERENCES CITED

The following references are of record in the file of this patent:

UNITED STATES PATENTS

| Number | Name | Date |
|---|---|---|
| 2,130,134 | Iams | Sept. 13, 1938 |
| 2,172,395 | McSpadden | Sept. 12, 1939 |
| 2,189,457 | Archer | Feb. 6, 1940 |
| 2,195,863 | Knick | Apr. 2, 1940 |
| 2,244,513 | Burton | June 3, 1941 |
| 2,300,189 | Wolff | Oct. 27, 1942 |
| 2,310,328 | Swift | Feb. 9, 1943 |